United States Patent [19]

Kiji et al.

[11] Patent Number: 5,053,905
[45] Date of Patent: Oct. 1, 1991

[54] HARDENED CENTER PIN CONTRACT AREA ON MAGNETIC DISK CARTRIDGE

[75] Inventors: Syuji Kiji; Keizou Takahashi, both of Ichigai, Japan

[73] Assignee: Kao Corporation, Tokyo, Japan

[21] Appl. No.: 480,967

[22] Filed: Feb. 16, 1990

[30] Foreign Application Priority Data

Mar. 7, 1989 [JP] Japan .................... 1-25804[U]

[51] Int. Cl.$^5$ .................................... G11B 23/03
[52] U.S. Cl. .......................... 360/133; 360/97.01
[58] Field of Search ............... 360/133, 135, 97.01; 369/291, 261, 270; 206/444, 312, 524.6

[56] References Cited

U.S. PATENT DOCUMENTS 4,812,937 3/1989 Nemoto et al. .................. 360/133
4,855,857 8/1989 Ono et al. ....................... 360/133

FOREIGN PATENT DOCUMENTS 0109031 6/1985 Japan .......................... 360/133

Primary Examiner—Robert S. Tupper
Assistant Examiner—Andrew L. Sniezek
Attorney, Agent, or Firm—Birch, Stewart, Kolasch & Birch

[57] ABSTRACT

A magnetic disk cartridge is of the type in which a magnetic disk is rotatably disposed within a jacket. A hardened layer of an ultraviolet ray hardening resin is formed on an inner surface of the jacket which is contacted with a tip of a center pin of a magnetic disk driving apparatus passing through an opening portion of the magnetic disk. The hardness of the hardened layer is $1 \times 10^{10}$ dyn/cm$^2$ to $1 \times 10^5$ dyn/cm$^2$.

6 Claims, 2 Drawing Sheets

HARDENED CENTER PIN CONTRACT AREA ON MAGNETIC DISK CARTRIDGE

BACKGROUND OF THE INVENTION

1. Field of the Invention

This invention relates to a magnetic disk cartridge, and more particularly to a construction of an inner surface of a jacket of the magnetic disk cartridge at which a center pin of a magnetic disk driving apparatus contacts.

2. Description of the Prior Art

A magnetic disk cartridge comprises a jacket and a magnetic disk rotatably disposed within the jacket. The magnetic disk has a hub at its center, and an opening portion for permitting a center pin of a magnetic disk driving apparatus to be inserted therein is formed in the hub. The arrangement is such that when the magnetic disk is rotating within the jacket, the pin is caused to pass through the opening portion of the magnetic disk and its tip is contacted with the inner surface of the jacket. Therefore, as there is a fear that the jacket will be damaged by the tip of the pin, a pin contacting portion within the jacket is formed as a projection of a circular shape and in order to protect the projection from being damaged, a chip made of an ultra high molecular polyethylene is applied to the projection by using an adhesive agent (double coated adhesive tape, etc.). That is, the protection layer, as described above, comprises the polyethylene chip and the adhesive agent. The protection layer is formed in a circular shape or the like so as to be in good conformity with the configuration of the projection. The protection layer is formed through a plurality of steps such as, for example, a step for applying an adhesive agent to a polyethylene film such as polyethylene sheet, etc., a step for cutting the polyethylene film to form the chip, and a step for applying the chip to the projection of the jacket.

As a conventional protection layer in the magnetic disk cartridge is formed through a plurality of steps as mentioned above, it has such a problem as that a considerable labor is required in order to form the conventional protection layer.

SUMMARY OF THE INVENTION

Therefore, it is an object of the present invention to provide a magnetic disk cartridge which is excellent in antiwear property and antishock property. The protection structure of the present invention is simple and ensures a good productivity of the cartridge.

In order to achieve the above object, the inventors of the present invention have studied about protection structures of the contacting portion of a center pin of a magnetic disk driving apparatus from various angles. As a result, they have found that a satisfactory protection layer can be formed with ease by forming a hardened layer of a particular hardness made of a particular hardening resin.

The present invention has been accomplished based on the above finding. According to the present invention, there is essentially provided a magnetic disk cartridge in which a magnetic disk is rotatably disposed within a jacket, said magnetic disk cartridge being characterized in that a hardened layer of an ultraviolet ray hardening resin is formed on an inner surface of said jacket which is contacted with a tip of a center pin of a magnetic disk driving apparatus passing through an opening portion of said magnetic disk, the hardness of said hardened layer being in the range from $1 \times 10^{10} dyn/cm^2$ to $1 \times 10^5 dyn/cm^2$.

According to the present invention, there can be provided a magnetic disk cartridge in which antiwear property and antishock property to the center pin of a magnetic disk driving apparatus are excellent and the protection structure of the contacting portion of the inner surface of the jacket for receiving the center pin therein is formed in a simple structure and ensures a good productivity of the cartridge.

DETAILED DESCRIPTION OF THE PREFERRED EMBODIMENT

The present invention will be described hereinafter with reference to FIG. 1 through 3.

Figure 1:
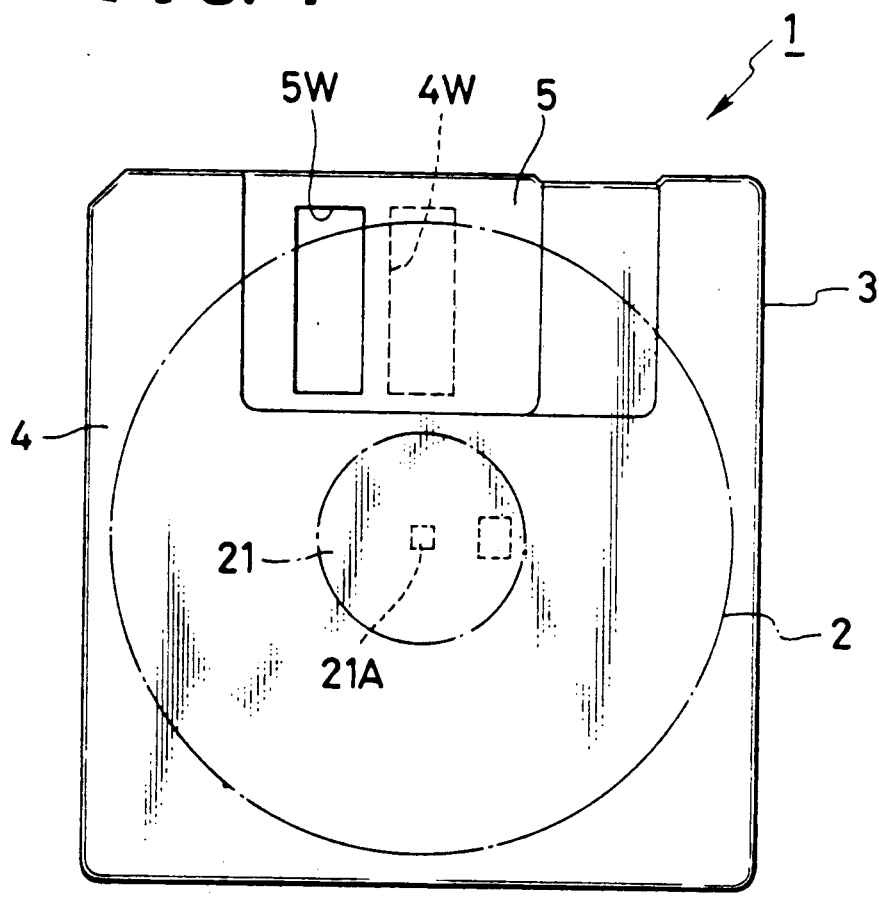
FIG. 1 is a plan view showing one embodiment of a magnetic disk cartridge of the present invention.

A magnetic disk cartridge 1 of this embodiment, as shown in FIG. 1, comprises a magnetic disk 2, and a jacket 3 for rotatably containing therein the magnetic disk 2.

The jacket 3 mainly comprises a jacket body 4 for rotatably containing therein the magnetic disk 2. The jacket body 4 is provided with a window 4W for a magnetic head (not shown) to approach to and which is formed at one edge portion of the jacket body 4, and more concretely at the center of the jacket body 4 in the vicinity of said one edge portion on the inserting side of the magnetic disk cartridge 1 into the recording/reproducing apparatus. The magnetic head is approached to the window 4W for recording and reproducing.

Also, the jacket body 4 has a rectangular shutter 5 folded into a generally U-shape in section and slidably attached to the one edge portion of the jacket body 4. The shutter 5 is provided with a hole 5W corresponding to the window 4W and formed in such a manner as to be displaced to one edge along the inserting direction of the magnetic disk cartridge 1. When the magnetic disk cartridge 1 is not in use, the hole 5W is not registered with the window 4W and the window 4W is covered with the shutter 5 in order to protect the magnetic disk 2.

Figure 2:
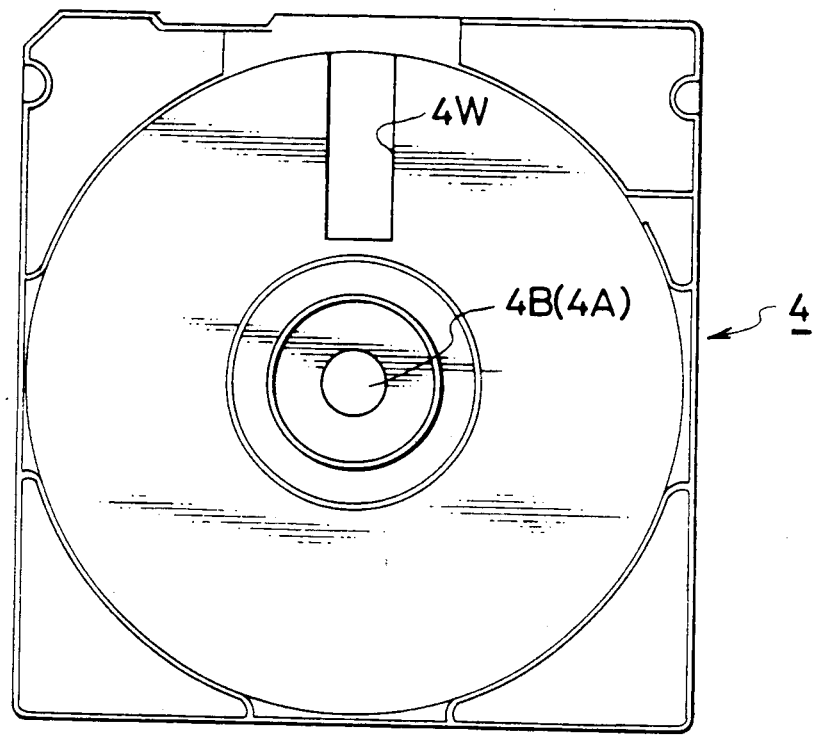
FIG. 2 is a plan view showing one inner surface of a jacket of the magnetic disk cartridge.
Figure 3:
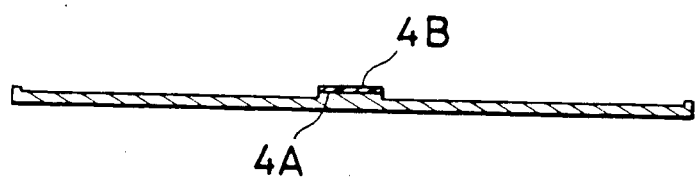
FIG. 3 is a sectional view taken along the center line of FIG. 2.

A circular projection 4A, as shown in FIGS. 2 and 3, is formed at the center of the inner surface of the jacket body 4 and is integral with jacket body 4. A center hub 21 of the magnetic disk 2 contained in the jacket body 4 is placed opposite the projection 4A, and a center pin (not shown) of a magnetic disk driving apparatus passing through the opening portion 21A formed in the center of the center hub 21 is contacted with the projection 4A. It is preferable that the projection 4A is formed in such a manner as o project outward by 0.1 mm to 0.4 mm from the inner surface of the jacket body 4. If the thickness or height is less than 0.1 mm, it is difficult to be used as a mark when an ultraviolet ray hardening resin is applied as will be described hereinafter. On the contrary, if the thickness exceeds 0.4 mm, there is a fear that it could be an interference at the time when the magnetic disk 2 is rotatably contained within the jacket body 4.

Furthermore, a hardened layer 4B of the ultraviolet ray hardening resin is formed on the outer surface of the projection 4A as a protection layer. This hardened layer 4B is formed in such a manner as that after the ultraviolet ray hardening resin is applied to the projection 4A, an ultraviolet ray is irradiated to the ultraviolet ray hardening resin for several seconds to harden the ultraviolet ray hardening resin.

The hardened layer (protection layer) 4B is a layer formed with hardness in the range from $1 \times 10^{10} dyn/cm^2$ to $1 \times 10^8 dyn/cm^2$ to $1 \times 10^5 dyn/cm^2$. If the hardness is in the range from less than $1 \times 10^5 dyn/cm^2$, the antiwear property against the contact of the tip of the center pin is deteriorated. On the contrary, if it is $1 \times 10^{10} dyn/cm^2$ or more, the resiliency of the layer is too low and the shock absorbency property is not sufficient.

As for an ultraviolet ray hardening resin used in this embodiment, it can be a synthetic resin and the like including, for example, a urethane acrylate system, a polyester acrylate system, etc.

As described in the foregoing, in the magnetic disk cartridge 1 of this embodiment, as the protection layer is of such a simple layer structure as that after an ultraviolet ray hardening resin is applied to the projection 4A, an ultraviolet ray is simply irradiated onto the ultraviolet ray hardening resin for several seconds to form the hardened layer 4B, the assembling process of the cartridge can be much simplified compared with the conventional method. By this, productivity of the magnetic disk cartridge 1 can be improved extensively. Moreover, the hardened layer 4B has the hardness of in the range from $1 \times 10^{10} dyn/cm^2$ to $1 \times 10^5 dyn/cm^2$ and is excellent in antiwear property and antishock property as a protection layer.

Figure 4:
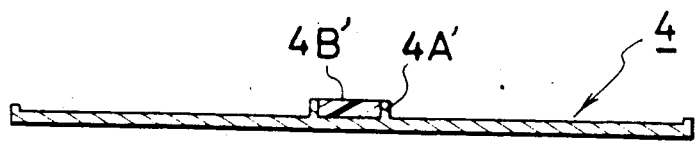
FIG. 4 is a sectional view showing an important portion of second embodiment of a magnetic disk cartridge of the present invention.

In the above-mentioned embodiment, although description has been made in a case where a circular projection 4A is formed on the inner surface of the jacket body 4, the present invention is not limited to the above-mentioned embodiment. For example, as another embodiment shown in FIG. 4, it may be constructed such that an annular projection 4A' is formed and an ultraviolet ray hardening resin is applied to the inner portion thereof to form a hardened layer 4B'.

What is claimed is:

1. A magnetic disk cartridge in which a magnetic disk is rotatably disposed within a jacket, said magnetic disk cartridge being characterized in that a hardened layer of an ultraviolet ray hardening resin is formed on an inner surface of said jacket which is contacted with a tip of a center pin of a magnetic disk driving apparatus passing through an opening portion of said magnetic disk, said hardened layer having a hardness in a range from $1 \times 10^{10} dyn/cm^2$ to $1 \times 10^5 dyn/cm^2$.

2. A magnetic disk cartridge as claimed in claim 1, wherein said jacket is provided on an inner surface thereof with a projection of 0.1 mm to 0.4 above said inner surface and said hardened layer of the ultraviolet ray hardening resin is formed on said projection adjacent said opening portion.

3. A magnetic disk cartridge as claimed in claim 1, wherein an annular projection with a center cavity is formed on said inner surface of said jacket and said hardened layer of the ultraviolet ray hardening resin is formed adjacent said opening portion with said cavity.

4. A magnetic disk cartridge comprising a magnetic disk and a jacket, said magnetic disk having a center hub and being rotatably disposed within said jacket, said central hub having an opening portion for receiving a center pin of a magnetic disk driving apparatus therethrough, said jacket having an inner surface, said inner surface having a projection, said projection being centrally disposed and having a projected end, said end being disposed in spaced apart relationship from said central hub and opposite to said opening portion, said end having a hardened layer of an ultraviolet ray hardening resin formed thereon, said hardened layer having a hardness in a range of $1 \times 10^{10} dyn/cm^2$ to $1 \times 10^5 dyn/cm^2$.

5. A magnetic disk cartridge as claimed in claim 4, wherein said end is disposed from 0.1 mm to 0.4 mm above said inner surface and said hardened layer of the ultraviolet ray hardening resin is formed on said end.

6. A magnetic disk cartridge as claimed in claim 4, wherein said projection is annular shaped with a central cavity and said hardened layer of the ultraviolet ray hardening resin is formed within said central cavity of said projection.

* * * * *